INVENTOR
JOHN ARCHER
GEORGE VINCENT CARCASSON
BY
AGENT

INVENTOR
JOHN ARCHER
GEORGE VINCENT CARCASSON
BY
AGENT

METHOD OF AND APPARATUS FOR POSITION-SELECTING, SCANNING AND THE LIKE

Filed Dec. 20, 1955

3 Sheets-Sheet 3

INVENTOR
JOHN ARCHER
GEORGE VINCENT CARCASSON
BY
AGENT

United States Patent Office 2,890,378

Patented June 9, 1959

2,890,378

METHOD OF AND APPARATUS FOR POSITION-SELECTING, SCANNING AND THE LIKE

John Archer and George Vincent Carcasson, London, England, assignors, by mesne assignments, to North American Philips Company, Inc., New York, N.Y., a corporation of Delaware Application December 20, 1955, Serial No. 554,317

Claims priority, application Great Britain December 23, 1954

14 Claims. (Cl. 315—13)

This invention relates to methods of position-selecting, scanning and the like and to apparatus for performing such operations. Such apparatus and methods may be applied inter alia to television systems or the like.

Scanning methods for television can basically be classified under two types:

(1) Beam deflection systems employing light beams or electron beams.

(2) Distributor systems.

Hitherto the first type of system has been preeminent using first mirror drums or the like and later cathode ray tubes. The second type of system has had very little application and then only when the number of lines in the picture was very low. It failed when the number of lines was increased to present standards, mainly through difficulties of distribution which resulted from the higher scanning speeds.

An advantage of distribution systems as compared with beam deflection systems is the possibility of drastic reduction of the depth of the display device of a television receiver. To scan a wide display area by deflection methods requires a relatively large depth; this depth decreases however with the reduction of the area to be scanned, and the present invention utilises this fact. On the other hand scanning by known purely distribution methods involves so many contacts as to be impracticable although the depth is then small.

It is an object of the present invention to provide improved display and scanning devices employing a combination of deflection and distribution methods.

Some preferred embodiments of the invention are illustrated in the accompanying drawing, in which.

According to the invention apparatus for position-selecting, scanning or the like comprises an electric discharge device having a plurality of electrode systems each adapted for generating and directing an individual electron beam towards a luminescent screen together with means for deflecting each beam over a local section of the said screen, and means for selecting the electrode systems in a predetermind squence such as to permit scanning of an area of the screen substantially equal to the aggregate of the areas of said local sections.

Figure 1:
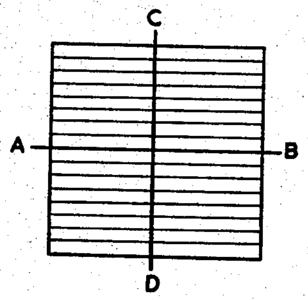
Fig. 1 shows how a raster is divided into scanned sections.

If the screen is to be scanned according to a normal television line raster with the aid of a display device comprising a plurality of cathode ray beam units arranged in rows and columns, then it is necessary for each beam to scan a predetermined portion of a given line of the raster and then be suppressed or obscured at the same instant as the beam of an adjacent unit takes over to continue the scanning of the same line. As a simple illustration of this scanning method reference may be made to an elementary form of the system shown in Figure 1 of the drawings. In this figure a raster is shown built up from a 2 x 2 beam system. The raster is scanned in four sections, the sections being obtained by bisecting lines AB, CD. There are four cathode ray units each being centred on a screen section, and each beam being capable of deflection. Section AC has its top line scanned first, followed by the top line of section BC. Then the second line of section AC is scanned followed by the second line of section BC. When sections AC and BC have been fully scanned, sections AD and BD are scanned in a similar manner until the entire raster is formed.

Such scanning may be effected by apparatus in accordance with the invention wherein each electrode system has at least two kinds of beam control electrodes and wherein the electrode systems are arranged in rows and columns with conductive interconnections between all control electrodes of one kind in any one row and further conductive interconnections between all control electrodes of another kind in any one column, the selecting means comprising means for applying a voltage to select the control electrodes interconnected in one of said rows and means for applying a voltage to select the control electrodes interconnected in one of said columns whereby at any instant a single electrode system may be selected to permit only its beam to excite said screen.

The voltage used for selecting the electrode systems in a predetermined sequence in one or each direction may be a rectangular wave impulse which progresses along a network having distributed tapping points, at which points the said wave appears in the sequence referred to. Apparatus in accordance with the invention may use various forms of this method employing both active and passive networks. Active networks include ring counters, gas-tube decade or like counters, cascades of bistable circuits and similar devices. Passive networks include delay lines, which may have either distributed or lumped constants.

When using delay lines, the use of a travelling rectangular wave impulse which appears in sequence at distributed tapping points can be extended to a pulse coincidence or interception technique as described and claimed in a co-pending application.

An example of this technique will be described hereinafter with reference to the arrangement of Figure 5 of the drawings when used with a delay line in each of the positions D1 and D2.

An electric discharge tube suitable for effecting scanning of this type may comprise a substantially planar luminescent screen, a plurality of electrode systems arranged in rows and columns, each of said electrode systems being adapted for generating and directing an individual electron beam towards said screen and each having beam control electrodes of at least two kinds together with a pair of electrostatic deflection electrodes for deflection in the direction of a row and a pair of electrostatic deflection electrodes for deflection in the direction of a column, and conductive interconnections between all control electrodes of one kind in any one row and further conductive interconnections between all control electrodes of the other kind in any one column.

In an example to be described later there are thirty-six columns and twenty rows of electrode systems or cathode ray beam units. The total number of beam units is therefore 720, each beam scanning a small rectangular section of the screen having an area 1/720 part of the whole raster area. It will be shown that, using e.g. a 4 x 4 beam system as a group, a specialised sine-wave deflection technique may be employed with advantage, the 4 x 4 beam groups being incorporated into an array of practical dimensions using 9 x 5 such groups or 36 x 20 beam units. Although each beam is acted on by its own electrodes, electrodes of one kind in one row or column may be electrically connected and may be constituted by a single mechanical structure which may be, for example a single conductive strip. Structurally, therefore, a complete system of 36 x 20 beam units is not by any means as complex as the product 720 might imply, and may consist of a matrix of punched conductive strips and sheets.

A specific embodiment of the invention, suitable for application to the 405-line television standard, will now be described by way of example with reference to Figures 2 to 6 of the diagrammatic drawings.

Figure 2:
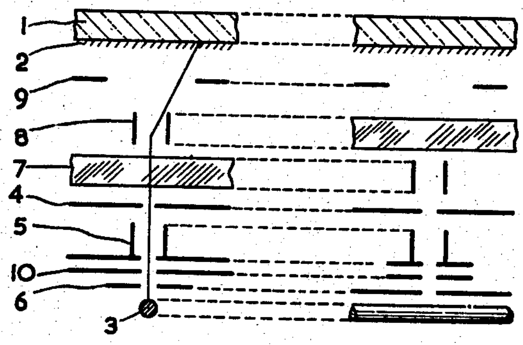
Fig. 2 shows an electron-beam source and deflection arrangement.

Referring to Figure 2, there are shown by means of two axial sections normal to each other, the constructional features of a single cathode ray beam unit. Although each beam electrode unit resembles a conventional cathode ray tube electrode system, all the units are linked by commoned electrode structures so as to make an economical and regular construction. A glass or other transparent plate 1 has on one surface a luminescent screen 2. A cathode ray beam emitted from a filamentary cathode 3 is accelerated by a third anode 4, focussed by a second anode cylinder 5 and controlled by a grid 6. There is also a first anode 10. Deflection is effected electrostatically by pairs of strip electrodes 7 and 8. The beam, after passing the deflection electrodes, strikes the screen 2. The beam may be relatively short, the total deflection angle being about 45°.

The following additional data are given by way of illustration as suitable for one cathode ray beam unit for use with a domestic size of tube. In such a tube having a screen of 54 x 40 cms. there will be 36 x 20 such units making a total of 720.

Scanned area 1.5 cm. horizontal x 2 cm. vertical approximate.

Total beam length (screen to cathode) about 9 cms.

Third anode accelerating voltage 1000–2000 volts.

| | |
|---|---|
| Beam current (intermittent) | 10 pulses per frame, each pulse lasting about 2½/μsec. and having a maximum current of about 2 ma. |
| Deflection voltage | 100–200 volts. |
| Focussing voltage | 300 volts. |
| 1st anode voltage | 100–200 volts. |
| Grid voltage | —10 volts. |
| Filament cathode | Oxide-coated filament e.g. as used in battery type directly heated valves. |

Since the raster is composite, there is a fundamental condition that the joinders of the boundaries of the scanned sections must not be objectionable. To overcome this problem the beam is overswept so that its excursion on the screen would, but for beam obscuring arrangements, tend to overlap into adjacent screen sections. One such system is the use of a mask having a rectangular aperture 9, as shown in Figure 2, fairly near the luminescent screen. The aperture is of a suitable size just to allow an excursion of 1.5 x 2 cms. on the luminescent screen. The overswept beam is trapped by the edges of the mask aperture which edges are maintained in third anode potential. An alternative restraining device is the use of thin conductive partitions normal to and near or at the luminescent screen which can also trap the overswept portions of the beams. Thus the operating requirements are that sections which are not scanning must either have their beams obscured or suppressed. A combination of obscuring and suppressing techniques is used in this example.

The suppressing technique is straightforward distributor practice. Each row of cathode ray beam units has one conductively connected electrode system, say all grid electrodes in this row, while each column of the units has one other electrode system conductively connected, say all the first anodes in the column. This may be accomplished quite simply by having all grids in one row consisting of apertures in a strip of a length substantially equal to that of the row. The first anodes may similarly consist of one strip substantially equal in length to a column with apertures punched at desired points to allow passage of the cathode ray beams.

Then all beams can be suppressed except the one controlled by the intersection of a selected grid strip and a selected first anode strip, provided this grid strip is sufficiently positive and the first anode strip has the correct voltage applied thereto. All other grid strips are sufficiently negative and all other first anode strips zero or negative.

*Deflection arrangements*

A deflecting system suitable for use with the combination of obscuring and suppressing techniques referred to above will now be described with reference to Figure 3. This shows a four-row, four-column group of sixteen cathode ray units as already described with reference to Figure 2. The complete cathode ray display device has an integral number of the groups of which Figure 3 is one, in both vertical and horizontal directions.

Figure 3:
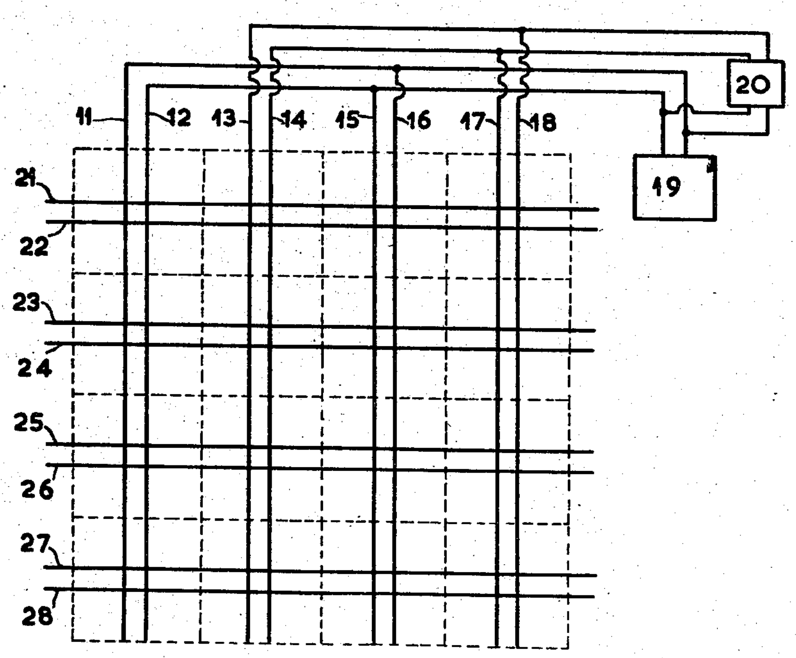
Fig. 3 shows an arrangement for applying deflection signals to pairs of deflection elements.

In Figure 3 the pairs of deflecting strips are shown for horizontal deflection at (11, 12) (13, 14) (15, 16) (17, 18).

Assuming that the top row of units has been selected by the frame scan distribution means, which means will be described later, then, for line scanning, strip pair (11, 12) has a substantially linear deflection voltage applied to deflect its top beam horizontally across its rectangular top section of the luminescent screen. Strip pair (13, 14) then takes over followed by (15, 16) and (17, 18) to build up a linear single trace horizontally across the screen. Each pair of strips can be supplied with saw-tooth or triangular-wave deflection voltages but it is convenient here to use sine-wave deflecting voltages from a generator 19 and to utilise the fact that the portion of a sine-wave ±45° is fairly linear, the non-linear end portions being compensated for by the use of a wide deflection angle. Then each pair of deflecting strips must be supplied with sine-wave voltages shifted relatively to each other in phase by successive increments of 90° e.g.

| | Degrees |
|---|---|
| Deflection strips **(11, 12)** phase shift | 0 |
| Deflection strips **(13, 14)** phase shift | 90 |
| Deflection strips **(15, 16)** phase shift | 180 |
| Deflection strips **(17, 18)** phase shift | 270 |

When deflection strip pair 17, 18 has completed the deflection of its top electron beam from left to right across its top section of the luminescent screen, the next group to the right continues the scan. This involves a precisely similar operation to that just described and as the relative phase shifts for the deflection strips of this next group have the same values as those just given i.e. 0°, 90°, 180° and 270°, these deflection strips are connected in the same way as strips 11–18 to the same generator 19. All other groups left or right have their pairs of vertical strips similarly connected to the same common generator 19. At the same time each pair of strips extends vertically through adjacent groups to the limits of the display system so that sine-wave generator 19 provides line deflection voltages for the entire display device.

The necessary phase shifts are obtained in the following way. By arranging for strips (11, 12) and (15, 16) to be in parallel but reversely connected, as shown, and supplied from a zero phase shift source 19, the 180° phase shift for (15, 16) is satisfied. An analogous connection for strips (13, 14) and (17, 18) to source 19 through a 90° phase shift device 20 then completes the horizontal deflection system.

Since these deflection potentials are applied throughout the entire sine-wave cycle, unwanted excitation of the luminescent screen by the various beams could occur but for the fact that (1) deflection in the regions +45°–135° and 225°–315° causes the beam to be intercepted by the mask 9 (Figure 2) and (2) excitation in the region 135°–225° is prevented by arranging for the distributor system to suppress the beams in question.

Frame deflection may be obtained by having a similar deflection arrangement for the group of strip pairs (21, 22) to (27—28) and other groups of horizontal strips above and/or below said group, operated at a different and much lower sine-wave frequency from another common sine-wave source (not shown) together with a vertical distributor system; thus the whole screen area may be scanned line-by-line as with a conventional single beam cathode ray tube. Interlace may be arranged by supplying an auxiliary wave of small amplitude in addition to that supplied from the lower frequency sine wave source so as to give a displacement of one line in the vertical direction on alternate frames.

*Distributor arrangements*

The distributor selecting system may now be described with reference to a complete system using 9×5 of the groups in Figure 3. The distribution system is then required to cause one column and one row alone of the beam to be selected.

In the present example the cathode-ray beam units have their electrodes connected as follows, the numerals having reference to Figure 2.

Filament cathodes (3)—One wire for the length of each column—thirty-six wires in all.

Grids (6)—The grids in each row are commoned by conductive connection—total number twenty.

1st anode (10)—Anodes in each column commoned by conductive connection—total number thirty-six.

2nd anode (5) (focus)—Anodes in each column conductively connected—total number thirty-six.

3rd anode (4)—All anodes conductively connected, e.g. a single plate period in 720 places to allow the beams to emerge.

Figure 4:
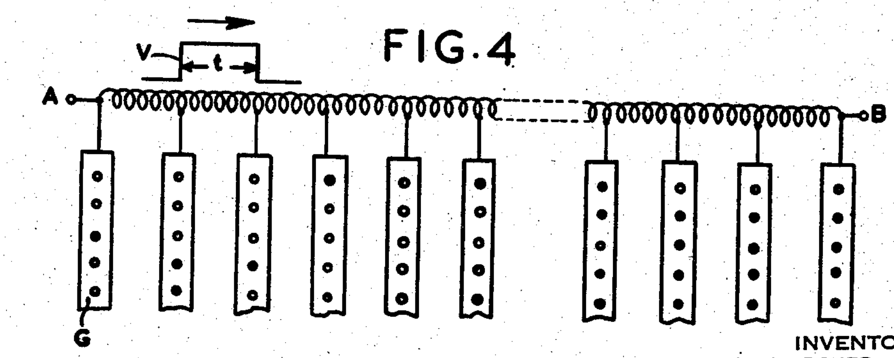
Fig. 4 shows an arrangement for applying a control signal to control electrodes.

Distribution can be effected in the following way. Referring to Figure 4, a rectangular voltage wave impulse V caused to travel along an electromagnetic delay system AB having a number of distributed tapping points will result in each tapping point producing a voltage at that point (neglecting attenuation) which will exist for the duration of the said impulse. If in a system of cathode ray units of the type just described all first anode rows, e.g. rows G, are connected each to one tapping point for, in effect, line scanning, the columns may be arranged to be excited in turn by a rectangular voltage impulse. A similar arrangement with another delay system for frame scanning using the grid electrodes arranged in rows energises a single one of the cathode ray units in the column which happens to be excited so that only the cathode ray beam in this unit is available for deflection. Thus all the beams may be brought into action sequentially so as to give a scan of the raster. This method of distribution would normally demand that the rectangular voltage wave for each direction should have a duration $t$ (Figure 4) exactly equal to the time taken to traverse the distance between two tapping points. Using standards of 405 lines and 50 frames per second interlaced, and a thirty-six-column, twenty-row cathode ray unit system, results in a time of 85 microseconds for each line scan (excluding flyback time) or a voltage impulse duration of $^{85}/_{36}$ microsecond. For the frame direction the voltage impulse duration would be substantially 1 millisecond.

These durations may, in fact, be somewhat exceeded with the present system which uses masks 9 (Figure 2) to limit the excursion of each deflected beam, since a beam may still be allowed to exist while masked. Accordingly the rectangular voltage wave durations may exceed the aforementioned times: this is a great advantage since it permits the said durations to be non-critical.

*Horizontal distributor*

A simple way, in theory, of causing any one column to be operative is to have a delay equal to one television scanning line duration and in the present example to have thirty-six tapping points each operative on a column. A rectangular impulse applied at the input of the delay line and having a duration slightly longer than the time required to scan horizontally one rectangular screen section would then give the required progression. There are three objections to this method:

(1) The delay time of 85 μs. required is large and requires an expensive line;

(2) Attenuation of such a delay line is high;

(3) Thirty-six seals would be required in the envelope of the device for horizontal distribution alone.

Figures 5, 6:
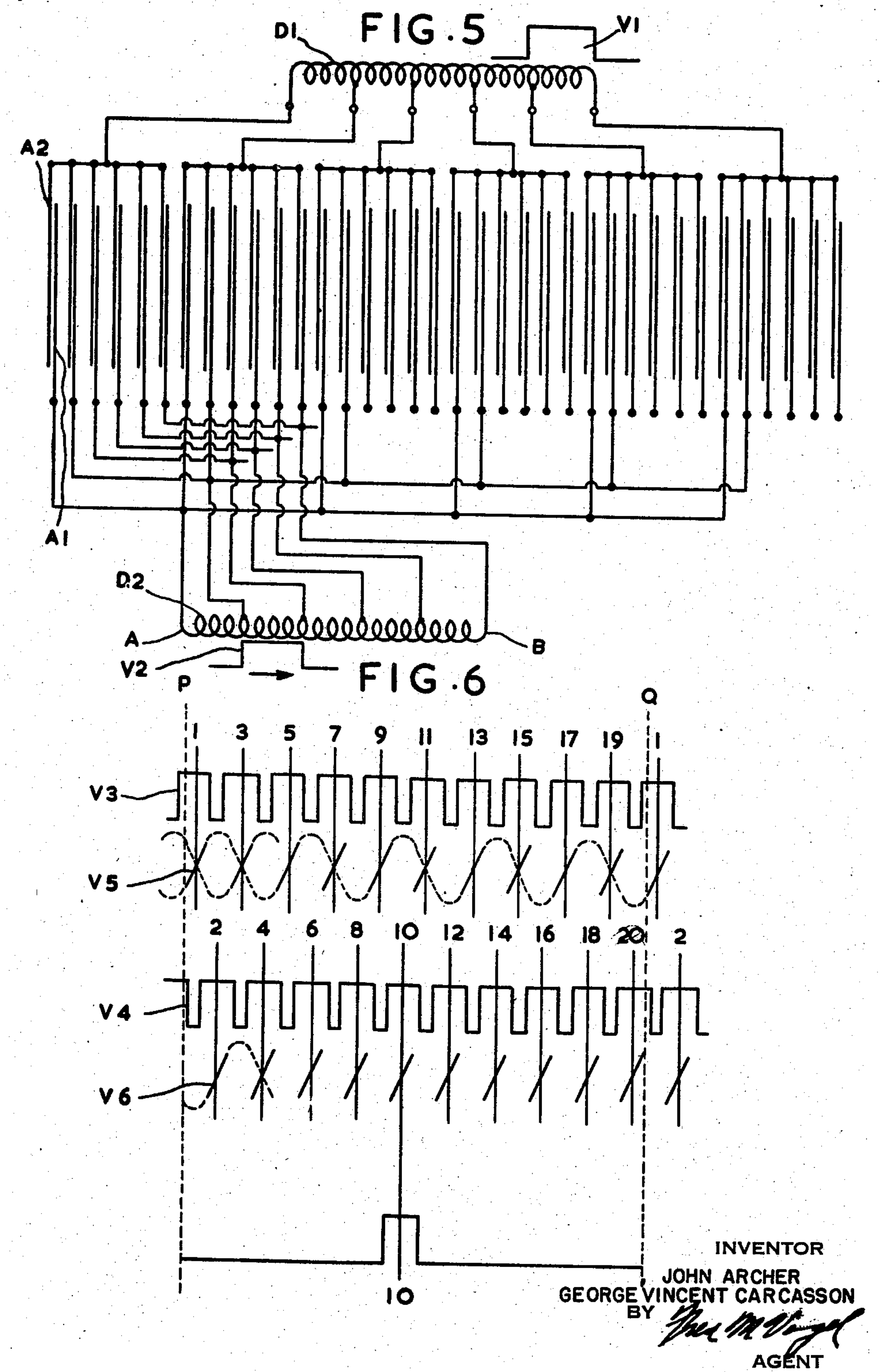
Fig. 5 shows an arrangement for applying control signals to deflection electrodes.
Fig. 6 shows the time relationship of control signals and deflection signals.

The solution adopted in Figure 5 is to use two delay lines for horizontal scanning and to use an impulse coincidence technique. This gives the required distribution as with a single long delay line and avoids the aforesaid objections to a large extent. This technique will now be described in greater detail with reference to Figure 5.

Figure 5 shows schematically thirty-six columns of pairs of elements, each pair of which is intended to represent a column $A_1$ of first anodes (as 10 of Figure 2) and a column $A_2$ of second anodes (as 5 of Figure 2) respectively. A delay arrangement $D_1$, which though shown schematically as a line, in practice is an electronic distributor having six tapping points, has each tapping point connected to six adjacent second-anode columns as shown. A second delay arrangement $D_2$, which may be a delay line proper, also has six tapping points, each of which is joined to six first-anode columns, $A_1$. However in this case the connection is such that columns Nos. 1, 7, 13, 19, 25, 31 are in parallel with one tapping point, with the other columns having the same spacing similarly connected. (The connections required have not all been shown in Figure 5 to avoid confusion.)

To achieve distribution, delay system $D_1$ is caused to produce a rectangular voltage wave $V_1$, having a duration equal to the time required to scan six units horizontally e.g. approximately $$6\times\frac{85}{36} \text{ or } 14 \text{ microseconds}$$

this rectangular voltage wave being applied sequentially to each of the tapping points on $D_1$. One group of six second-anode columns $A_2$ may be energized and then, immediately after, the next adjacent group and so on across the six groups.

To select one column in the operative anode group the second delay system $D_2$ has supplied to its input terminal A a rectangular voltage wave $V_2$ having a duration of $^{85}/_{36}$ microsecond (or slightly longer). The velocity of propagation of delay system $D_2$ is such that each tapping point is reached by the said voltage wave $^{85}/_{36}$ microseconds after the preceding tapping point. When the said voltage wave is just about to leave the delay system at B, another similar voltage wave is injected at point A, a continuous sequence of such voltage waves being so timed to arrive at point A. The operation of delay system $D_1$ and $D_2$ is controlled in dependence or line synchronising signals whereby the horizontal scan is maintained in synchronism. The horizontal deflection sine-wave oscillator 19 (Figure 3) is also maintained in synchronism with the line synchronizing signals and with the rectangular waves of the delay systems $D_1$ and $D_2$. In consequence it can be arranged that the first of the thirty-six columns of cathode ray beam units may be selected at an instant just after the line synchronising signal so as to initiate horizontal scanning at the correct time. Since there are only two sets of six tapping points involved, only twelve seals are required in the vacuum envelope for the purpose of supplying the thirty-six pairs of electrodes shown in Figure 5, if the delay systems are outside the envelope. The cross-connections between electrodes are preferably arranged within the envelope.

An alternative form of horizontal distribution is possible wherein delay system $D_1$ has its tapping points connected to spaced columns connected in parallel in similar manner to that described for delay system $D_2$ but in which the spacing is different by at least one, and preferably two columns. This involves a number of tapping points on $D_1$ different from the number on $D_2$.

In this alternative the modified delay system $D_1$ also operates with a rectangular wave supplied to its input of the same duration as that supplied to the modified delay system $D_2$ ($^{85}/_{36}$ microsecond) but the different number of tapping points on $D_1$ requires that the repetition frequency of the voltage wave on $D_1$ be different from that required for $D_2$. This difference in repetition frequency in combination with the difference in the number of tapping points, gives the required result that only one pair of anode columns at any instant shall have the rectangular voltage waves from each delay line present together at the said pair. The continuous movement of the voltage waves along the delay systems then effects the required distributor action across all the pairs of elements shown in Figure 5.

*Vertical distribution*

For vertical distribution there are twenty rows of electrode systems. One row is operative for a time of one millisecond if the frame time is $^1/_{.50}$ second. Delay lines are unsuitable for times of this order. Instead two gas-discharge transfer devices may be used as a distributor. One set of ten alternate rows of grids 6 (Figure 2) is operated on by one such device while the other device operates on the remaining ten rows. Such gas-discharge transfer devices are well known and in the form known as ring-counters have been described in "Electronic Engineering," 1950, pages 173 to 177. When supplied by suitable waveforms of a repetitive nature these devices effect a transfer from one of their electrods to another at each repetition. Thus a device having ten such electrodes can give ten transfers which by connection from said electrodes to the electrodes of ten alternate rows of grids 6 of the display systems, results in the latter rows being energized in sequence. The other set of alternate rows are also sequentially energized by the other gas-discharge transfer device.

The use of two gas-discharge devices operating on alternate rows avoids the difficulties which would arise during transfer periods if only one gas-discharge transfer device were used operating on all the rows. The transfer period of these gas-discharge devices is relatively long due to deionization phenomena and generally is much longer than the line blanking time (15 microseconds). Thus with two gas-discharge devices operating as described, while one is performing selection of a required row of grids the other has ample time to execute its transfer; the two rows of grids which are involved in such transfer cannot allow excitation of the luminescent screen since the electron beams which they control, at the corresponding period of the deflection cycle, are directed towards the mask 9 (Figure 2).

Alternatively, a single transfer device which can complete its transfer in less than the line blanking period can be used to control all twenty rows of grids. Such a transfer device might consist of a cascade of trigger circuits of the thermionic tvoe.

Figure 6 shows graphically the relation between the deflection voltages and the voltages produced by the transfer action of the pair of gas-discharge transfer devices. A common time-axis is used (abscissa), the sets of voltages being represented (displaced) in the ordinate direction. The scale of the deflection voltages is unrelated to that of the transfer action voltages.

In this figure $V_3$ represents the voltage which exists in time at the alternate rows of grids numbered 1, 3, 5 . . . 15, 17, 19 and which results from the gas-discharge transfers from cathode to cathode of ten separate main cathodes of the transfer device connected to these grids. V5 represents the deflection voltage waveforms applied to the deflection strips and which provide vertical deflection for the cathode-ray beams associated with the said rows of grids 1, 3, 5 . . . 15, 17, 19. The solid lines show the portions of the deflection voltage waveform which scans the luminescent screen, the dotted lines indicating the remaining portions of the sine-wave which constitute the deflection voltage. Only part of the said remaining portions is however shown in the drawing.

$V_4$ represents the voltage waveform which exists in time at alternate rows of grids numbered 2, 4, 6 . . . 16, 18, 20 and which are controlled by the other gas-discharge transfer device. $V_6$ represents the deflection voltages required for the cathode-ray beams associated with these rows of grids. The voltage waves $V_3$ and $V_4$ interleave in time, this being arranged by timing of the transfer pulses which actuate the transfer auxiliary cathodes of the said transfer devices. The mode of operation of these transfer pulses is described in the abovementioned article in Electronic Engineering and will not be discussed here.

The waveforms $V_3$, $V_4$, $V_5$, $V_6$ are synchronized in time and have a time interval PQ equal to one frame of a television picture. This includes the blanking interval (about 5%). As this is short, it is hardly practical to arrange that PQ is equal to the frame transmission time (95%). The deflection voltage source will have a frequency of 250 cycles per second, and the transfer pulses which operate at a repetition frequency of 500 per second are synchronised to one another and to the frame synchronising signal. The transfer pulses which are not shown in the drawing occur in the gaps in the waveform $V_3$,$V_4$. These gaps may be relatively large but may not exceed the duration of the voltage on any one grid, e.g. the voltage for grid 10 shown at the foot of Figure 6.

It should be stated that the gas-discharge transfer devices required for the present application must have their main cathodes connected to separate terminals and not to a common ring conductor as is usual. The auxiliary transfer cathodes and the anode of the transfer devices may be conventional and connected to respective common ring conductors.

*Alternative methods of horizontal distribution*

As stated above, the system of Figure 5 employs an electronic distributor as part of the horizontal distribution arrangement. However, an electronic distributor can alone effect the distribution provided that 36 separate sealed connections are made to the 36 anodes $A_1$ or the 36 anodes $A_2$. In this case, it may be desirable to use the alternate or interleaved mode of connection described with reference to the vertical distribution. The anodes ($A_2$ or $A_1$) not controlled by the distributor are held at a common constant potential.

*Modulation*

Modulation of the cathode-ray beams by a picture signal may be achieved by varying the voltage of the cathode with respect to an operative grid 6. The cathode consists, as explained above, of thirty-six filaments and these may be parallel-connected. By providing the necessary heating current for these filaments from a transformer having a secondary winding which is designed so that its capacitance to ground is low, e.g. 20–25 $\mu\mu$f., the modulating voltage may be applied to the centre-tap of this secondary winding or of the filament system. Preferably the filaments have numerous parallel connections to reduce the heating potential difference along any filament and thus reduce the unwanted effect to modulation by the heating voltage.

The composite nature of the display device may allow the possibility of an unwanted pattern to appear on the luminescent screen in spite of the provision of mask 9 (Figure 2) or conductive partitions. A method of overcoming or reducing some forms of residual pattern is to arrange that the beam current reaching the luminescent screen is caused to generate a signal which is fed into the modulation circuit as negative feedback. By this means the current reaching the luminescent screen is caused to reproduce the modulation more accurately and unwanted patterns are reduced in intensity in proportion to the amount of negative feedback used. For negative feedback to occur, it is necessary to arrange the mask 9 (Figure 2) or the partitions to allow a very slight overlap of the scans of adjacent cathode ray beams, since negative feedback cannot compensate in an area of luminescent screen which is not scanned at all. The generation of a signal from the current reaching the luminescent screen requires that this screen have e.g. a transparent conductive layer connected to a separate electrode or else generate secondary emission which proceeds to a separate electrode, so that when the beam current proceeds towards the mask 9 (Figure 2) it does not contribute to the negative feedback. The mask 9, if conductive, may be conductively connected to final anode 4 (Figure 2).

*Colour television applications*

From the description relating to Figure 2 it will be clear that the horizontal deflection system produces in effect a scan over only 10–20 picture elements so that the excitation of these elements may be made very precisely in time and position. Therefore, if vertical bars of coloured phosphors are printed in sequence at each picture element position, such coloured phosphors may be excited by the cathode ray beam at required time-instants with the precision necessary for colour television without the use of indexing or other like special devices.

What is claimed is:

1. Apparatus for position-selecting, scanning or the like comprising an electric discharge tube having a plurality of electrode systems each adapted for generating and directing an individual electron beam towards a luminescent screen together with means for deflecting each beam over a local section of the said screen, and means for selecting the electrode systems in a predetermined sequence such as to permit scanning of an area of the screen substantially equal to the aggregate of the areas of said local sections, each said electrode system having at least two kinds of beam control electrodes, the electrode systems being arranged in rows and columns with conductive interconnections between all control electrodes of one kind in any one row and further conductive interconnections between all control electrodes of another kind in any one column, said selecting means comprising means for applying a voltage to select the control electrodes interconnected in one of said rows and means for applying a voltage to select the control electrodes interconnected in one of said columns whereby at any instant a single electrode system may be selected to permit only its beam to excite said screen.

2. Apparatus for position-selecting, scanning or the like comprising an electric discharge tube having a plurality of electrode systems each adapted for generating and directing an individual electron beam towards a luminescent screen together with means for deflecting each beam over a local section of the said screen, and means for selecting the electrode systems in a predetermined sequence such as to permit scanning of an area of the screen substantially equal to the aggregate of the areas of said local sections, each said electrode system comprising pairs of deflection electrodes for electrostatic deflection of the beam, one pair for deflection in the direction of the rows and the other pair for deflection in the direction of the columns, said pairs of deflection electrodes for deflecting in the direction of the columns being in rows with corresponding deflection electrodes in any one row conductively connected together, and said pairs of deflection electrodes for deflecting in the direction of the rows being in columns with corresponding deflection electrodes in any one column conductively connected together.

3. Apparatus according to claim 2 including means for applying deflection voltages to corresponding deflection electrodes of all electrode systems simultaneously.

4. Apparatus according to claim 3 for producing a rectangular television or like raster of lines and frames, wherein the deflection voltages for at least one direction of scanning are sine-waves synchronised with the selection means and are applied to successive deflection electrodes with a progressive relative phase displacement in the respective scanning direction equivalent to the time necessary for scanning a distance equal to the distance between the axes of said columns of rows respectively and an amplitude such that only symmetrical and substantially linear portion of the waveform is employed to deflect a beam through said distance in said time.

5. Apparatus for position-selecting, scanning or the like comprising an electric discharge tube having a plurality of electrode systems each adapted for generating and directing an individual electron beam towards a luminescent screen together with means for deflecting each beam over a local section of the said screen, and means for selecting the electrode systems in a predetermined sequence such as to permit scanning of an area of the screen substantially equal to the aggregate of the areas of said local sections, each of said electrode systems comprising a cathode and beam control electrodes comprising a control grid and an additional control electrode, and wherein the voltages for selection in one direction are applied between the cathode and a control grid of each electrode system, while the voltages for selecting in the other direction are applied between said cathode and said additional control electrode.

6. Apparatus according to claim 5 wherein two separate voltages for selection in one direction are applied respectively between the cathode and two of said beam control electrodes of each electrode system located between said cathode and a final accelerating anode thereof, both voltages being required together to permit excitation of the screen by a beam, and said voltages being so distributed that at any instant they are applied simultaneously to only one row or column of electrode systems.

7. Apparatus for position-selecting, scanning or the like comprising an electric discharge tube having a plurality of electrode systems each adapted for generating and directing an individual electron beam towards a luminescent screen together with means for deflecting each beam over a local section of the said screen, means for selecting the electrode systems in a predetermined sequence such as to permit scanning of an area of the screen substantially equal to the aggregate of the areas of said local sections, means for deriving a signal proportional to the current reaching said luminescent screen and means for applying said signal to at least one of said electrode systems as negative feed-back for the purpose set forth.

8. An electric discharge device comprising a substantially planar luminescent screen, a plurality of electrode systems arranged in rows and columns, each of said electrode systems being adapted for generating and directing an individual electron beam towards said screen and each having beam control electrodes of at least two kinds together with a pair of electrostatic deflection electrodes for deflection in the direction of a row and a pair of electrostatic deflection electrodes for deflection in the direction of a column, said deflection electrodes being adapted to deflect each of said beams over a different local area of said screen, and conductive interconnections between all control electrodes of one kind in any one row and further conductive interconnections between all control electrodes of the other kind in any one column.

9. An electric discharge device comprising a substantially planar luminescent screen, a plurality of electrode systems arranged in rows and columns, each of said electrode systems being adapted for generating and directing an individual electron beam towards said screen and each having beam control electrodes of at least two kinds together with a pair of electrostatic deflection electrodes for deflection in the direction of rows and a pair of electrostatic deflection electrodes for deflection in the direction of columns, said deflection electrodes being adapted to deflect each of said beams over a different local area of said screen, pairs of deflection electrodes for deflecting in a column direction being in rows with corresponding deflection electrodes in any one row conductively connected together, and pairs of deflection electrodes for deflecting in a row direction being in columns with corresponding deflection electrodes in any one column conductively connected together.

10. An electric discharge device as claimed in claim 9, in which beam control electrodes of a third kind are provided, the said control electrodes in any one column being conductively connected together.

11. An electric discharge device as claimed in claim 9, wherein the rows of pairs of deflection electrodes are arranged in groups of $n$ rows, corresponding electrodes in each group being connected together pair to pair.

12. An electric discharge device as claimed in claim 11 wherein the columns of pairs of deflection electrodes are arranged in groups of $m$ columns, corresponding electrodes in each group being connected together pair to pair.

13. An electric discharge device as claimed in claim 9, including means positioned for preventing excursion of the beam of any electrode system into a section of the screen appertaining to an adjacent screen section.

14. Apparatus according to claim 1, including a delay network, and wherein at least one of said selection voltages is a rectangular wave impulse which progresses along said network, said network having distributed tapping points each connected to one of said rows or columns of control electrodes respectively.

References Cited in the file of this patent

UNITED STATES PATENTS

| | | |
|---|---|---|
| 2,083,203 | Schlesinger | June 8, 1937 |
| 2,165,028 | Blumlein | July 4, 1939 |
| 2,170,944 | Glass et al. | Aug. 29, 1939 |
| 2,422,100 | Huff | June 10, 1947 |
| 2,558,019 | Toulon | June 26, 1951 |
| 2,587,074 | Sziklai | Feb. 26, 1952 |

FOREIGN PATENTS

| | | |
|---|---|---|
| 210,628 | Switzerland | July 31, 1940 |
| 597,947 | Great Britain | Feb. 6, 1948 |